No. 682,801. Patented Sept. 17, 1901.
T. B. JEFFERY.
CONTROLLING DEVICE FOR MOTOR VEHICLE DRIVING TRAINS.
(Application filed Oct. 27, 1900.)
(No Model.)
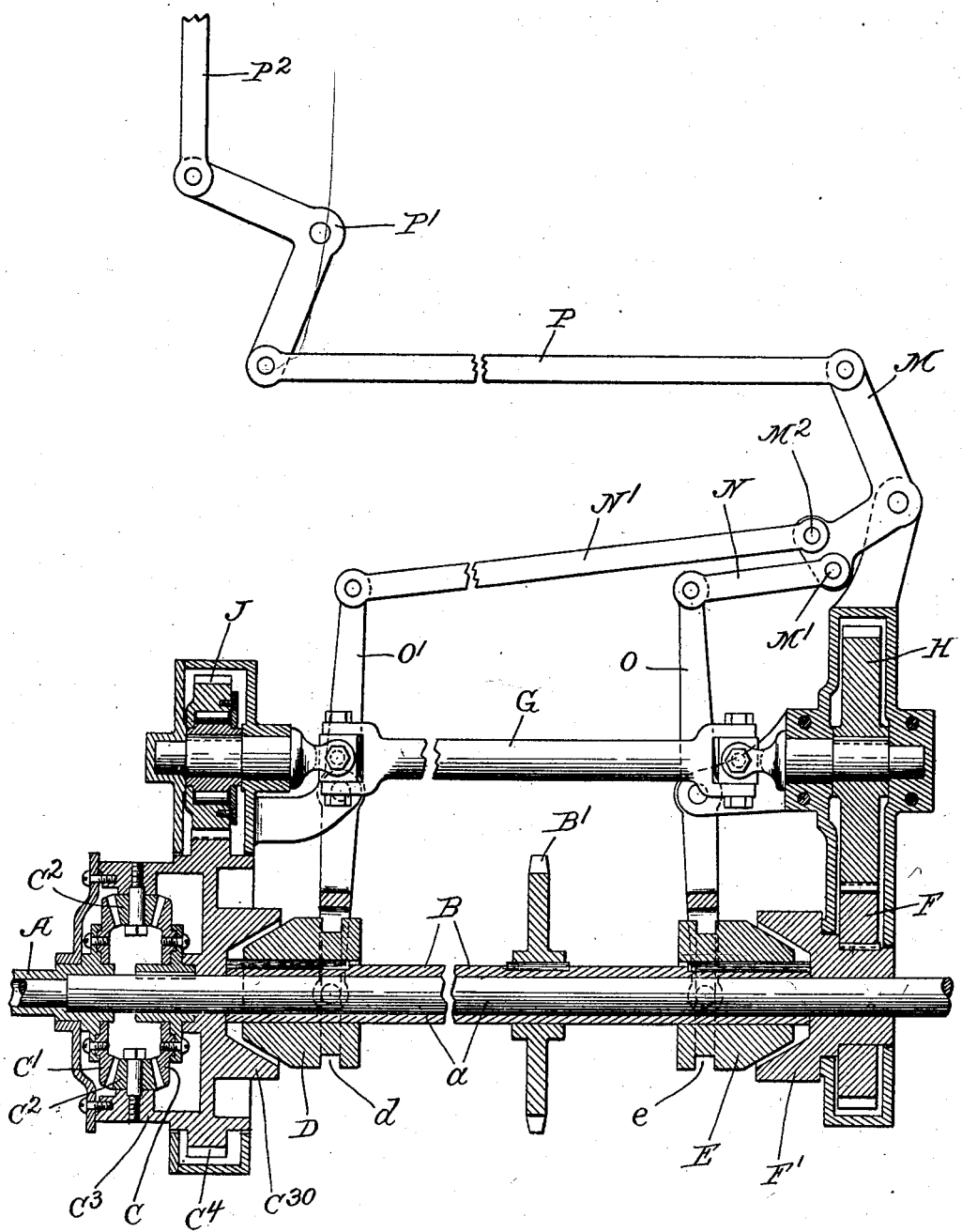
Witnesses.
Edward T. Wray.
Edgar L. Conant.
Inventor.
Thomas B. Jeffery.
by Burton & Burton
his Atty's.

UNITED STATES PATENT OFFICE.

THOMAS B. JEFFERY, OF CHICAGO, ILLINOIS.

CONTROLLING DEVICE FOR MOTOR-VEHICLE DRIVING-TRAINS.

SPECIFICATION forming part of Letters Patent No. 682,801, dated September 17, 1901.

Application filed October 27, 1900. Serial No. 34,606. (No model.)

*To all whom it may concern:*

Be it known that I, THOMAS B. JEFFERY, a citizen of the United States, residing at Chicago, in the county of Cook and State of Illinois, have invented certain new and useful Improvements in Controlling Devices for Motor-Vehicle Driving-Trains, of which the following is a specification, reference being had to the accompanying drawing, forming a part thereof.

The purpose of this invention is to provide a mechanism for operating the clutches by which the motor-driven element in a motor-vehicle is engaged at will with either a slow or a fast gearing train.

It consists of devices in which a single lever operated by the driver may in one movement in continuous direction first effect engagement of the slower train and afterward effect disengagement of the same and engagement of the faster train, so that without giving attention to the several movements separately the driver may impart slow-driving movement to the vehicle and bring it into operation at the higher speed after it has fully attained the lower. I have shown my invention adapted and applied to the driving mechanism of a motor-vehicle which is the joint invention of Robert W. Thompson and myself and is shown and claimed in our joint application, Serial No. 34,544, filed October 27, 1900. This driving mechanism it will be necessary to explain in part in order to enable one to understand the specific devices which constitute my present invention, and said driving mechanism is therefore partly illustrated.

The drawing is a plan view of the devices constituting my present invention shown in connection with a horizontal section of the driving mechanism which is controlled thereby, the section being at the axis of the traction-wheel-driving shaft.

The traction-wheel-driving shaft is shown at $a$. B is a sleeve loose thereon, which is driven by the motor, power being communicated by a chain operating upon the sprocket-wheel B', which is fast on said sleeve.

A is a sleeve-shaft of the outside gear of the compensating-gear structure, which comprises the gear C, rigid with the shaft $a$, the gear C', opposed to it, intermediate pinions $C^2 C^2$, and the pinion-carrying element $C^3$, which is loose on the shaft $a$. The hub $C^{30}$ of the pinion-carrying element $C^3$ is conically hollowed, adapted to receive the cone D, which is feathered on the sleeve B, said two elements—the hub $C^{30}$ and the cone D—constituting a clutch, by means of which the compensating-gear device is engaged with the motor-actuated sleeve. On the shaft $a$ at the opposite end of the sleeve B there is loosely journaled a gear F, having a conically-hollowed hub F', adapted to afford a seat for a cone E similar to the cone D, which is feathered on the opposite end of the sleeve B, said two elements—the hub F' of the gear F and the cone E—constituting a clutch for the engagement of the motor-driven sleeve B with the gear F.

G is a counter-shaft, having at one end a gear H, meshing with and driven by the gear F, and at the other end a gear J, meshing with and driving the pinion-carrying element $C^3$ of the compensating gear, said element having a peripheral gear-rim $C^4$ for this purpose. It will be understood that when the cone D is engaged with the conical hub $C^{30}$ the shaft $a$ is directly rotated at the speed which the sleeve B receives from the motor and that when the cone E is engaged by the hub F' of the gear F the compensating-gear element $C^3$ receives rotary motion at reduced speed, which is transmitted to the traction-wheel-driving shaft through the compensating-gear train precisely as when said element is engaged and driven directly by the engagement of the cone D.

O and O' are levers suitably fulcrumed on the running-gear frame and forked to engage the grooves $d$ and $e$ in the cones D and E to shift said cones on the motor-driven sleeve into and out of engagement with the other element of the clutches of which they respectively form a part.

My invention consists in the means for operating the levers O and O', respectively, to cause them to engage their respective clutches successively by means of one continuous movement of the operating-lever. For this purpose I employ a lever M, suitably fulcrumed on the running-gear frame. For the purpose of operating the lever M, I have shown a link P, connected at one end to said lever and at the other end connected to one arm of a bell-crank lever P', to the other arm of which a link P² is connected, which may extend to any suitable point for manipulation by the driver. From the lever M links N and N' extend to the levers O and O', respectively, the pivotal connections being so located and the length of the links being such that at a certain position both clutches are disengaged, as seen in the drawing, and both links deflected in the same direction from lines drawn from their pivotal connections with the levers O and O', respectively, intersecting the axis of the lever M, the deflection of the link, however, which operates the lever O and effects engagement of the clutch with the slower train being greater than the deflection of the link which operates the lever to give the faster speed. The relation of the parts is also, as would appear from an examination of the drawing, such that the slow-speed clutch is engaged by movement of the lever M which thrusts the pivotal connection of the link N away from the fulcrum of the lever M, while the engagement of the other clutch is caused by a movement of said lever M which draws the pivotal connection of the link N and lever O' toward the fulcrum. Hence it will be seen that the movement of said lever M from the position at which it is shown in the drawing in a direction tending to bring the links N and N' into lines successively intersecting the axis of the lever M will during the first part of said movement slightly withdraw the cone D of the higher-speed clutch, its maximum withdrawal being reached when the link N' is in line intersecting the axis of said lever M, and then will return it to its initial position, both said movements being caused while the same movement of the lever M is continuously moving the clutch-cone E into engagement with the hub F', such engagement being effected completely by the time the link N is in line intersecting the axis of the lever M, the position of the pivots being such that this engagement occurs substantially at the time the cone D, having been retracted, has been carried back to initial position shown in the drawing. The further continued movement of the lever M in the same direction, it will be seen, first carries the cone E out of engagement with the hub F', while carrying the cone D toward its position of engagement, and finally into engagement. Thus one continuous movement of the lever M first engages the slow-speed clutch and then after disengaging the same engages the fast-speed clutch.

To facilitate conciseness of reference to the structure and action above described, the position at which either of the links N or N' is in a line intersecting the axis of the operating-lever may be termed the "conjunction" of the lever with the links. Employing this phrase, the foregoing structure may be summarized by the statement that the location and proportion of the several parts is such that the conjunction of the lever M with the link which operates the clutch for driving the slower train occurs when the members of that clutch are in complete engagement and the conjunction of the lever with the other link occurs when the members of the other clutch are most widely separated and that said conjunctions are not coincident—that is, do not occur at the same position of the lever. The non-coincidence of these conjunctions is not essential, but has merely the effect, which is desirable, of increasing the interval between the engagement between the slow-speed clutch and the subsequent engagement of the fast-speed clutch at starting and to diminishing the interval between the disengagement of the fast-speed clutch and the subsequent engagement of the slow-speed clutch (which is followed by the disengagement of the latter) at stopping. The throw of the lever may be made so quickly that, if desired, the fast-speed clutch may be engaged without any sensible interval after engagement of the slow-speed clutch, so that the higher speed will be obtained as quickly as if there were no provision for the slower speed; but it is designed that the operator shall move the lever with some deliberation, so that there shall be time for the engagement of the slow-speed clutch to initiate the movement of the slow-speed train, and that the lever may be halted at that position for a sufficient time for the slow speed to be fairly gained before the movement of the lever continues to effect engagement of the fast train.

I do not limit myself to such location of the lever M as will require separate pivotal connections for the links N and N', nor to such location of the several connections as will make said lever of the nature of a bell-crank lever, as it appears in the drawing, because any mechanic will readily obtain the same result by varying the form of the lever and correspondingly varying its position relative to the several connections.

I claim—

1. In a driving mechanism for a motor-vehicle two differently-speeded trains, and clutches for engaging them respectively, devices for shifting clutch members of such clutches respectively; an operating-lever, and links connecting it to the clutch-shifting devices respectively, the pivotal connections of the operating-lever being arranged to cause it during its movement in one continuous direction about its axis to first effect engagement of the clutch which operates the slower, and afterward that which operates the speedier train.

2. In a motor-vehicle driving mechanism, two differently-speeded trains, one of which includes the other, and clutches for engaging them respectively, devices for shifting the clutch members of such clutches respectively, an operating-lever, and links connecting it to the clutch-shifting devices respectively, the pivotal connections of the operating-lever being arranged to cause it during its movement in one continuous direction about its axis to first effect engagement of the clutch which operates the slower, and afterward that which operates the speedier train.

3. In a driving mechanism for a motor-vehicle two differently-speeded trains and clutches for engaging the trains respectively, devices for shifting the clutch members of such clutches; an operating-lever, and links connecting the lever to such shifting devices respectively, the conjunction of the lever with the links which operate the clutch for driving the slower train occurring at the full engagement of the members of such clutch, and the conjunction of the lever with the other link occurring at the maximum separation of the members of the other clutch.

4. In a driving mechanism for a motor-vehicle, two differently-speeded trains, and clutches for engaging the trains respectively; devices for shifting the clutch members of such clutches; an operating-lever, and links connecting it to such shifting devices respectively; the conjunction of the lever with the links which operate the clutch for driving the slower train occurring at the full engagement of the members of said clutch, and the conjunction of the lever with the other link occurring at the maximum separation of the members of the other clutch, said conjunctions being not coincident.

5. In a driving mechanism for a motor-vehicle two differently-speeded trains and clutches for engaging them respectively, the levers O and O' for shifting clutch members of such clutches respectively; an operating-lever, M, and links, N and N', respectively, connecting it to the clutch-shifting levers; the pivotal connections of the links N and N' to the lever M being in different planes radial to the axis of said lever, and the pivots of the links to the levers O and O' respectively being so disposed with respect to the pivotal connections to the lever M and with respect to the clutches at their disengaged positions, that movement of the lever M from the position at which the clutches are both disengaged in direction to bring the links respectively into lines intersecting the axis of the lever M, engages first the slow-train clutch and afterward, while moving in the direction to disengage said clutch, engages the fast-train clutch.

In testimony whereof I have hereunto set my hand, in the presence of two witnesses, at Chicago, Illinois, this 22d day of October, A.D. 1900.

THOS. B. JEFFERY.

In presence of—
 CHAS. S. BURTON,
 EDGAR L. CONANT.